Figure 1:
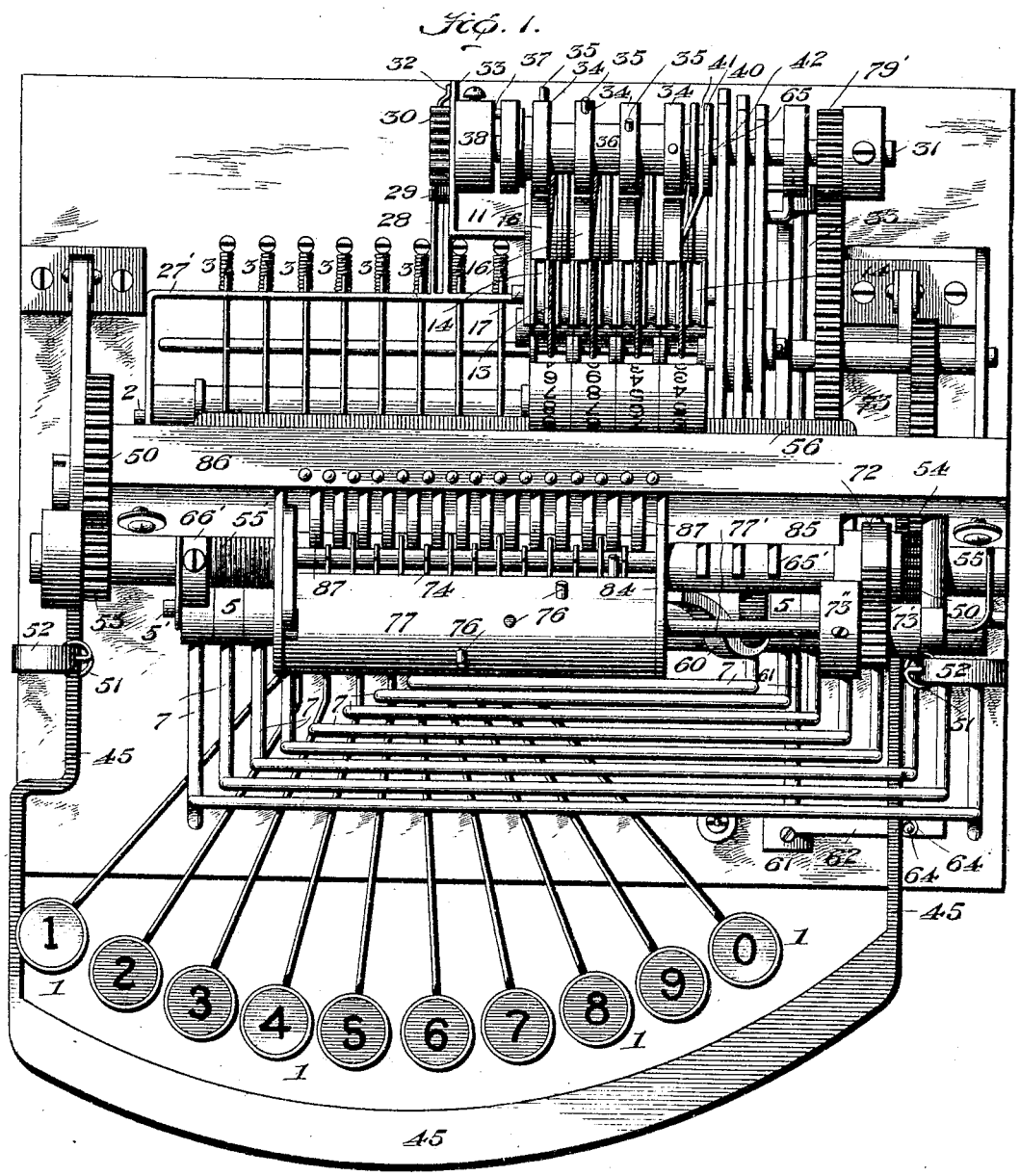

No. 770,875. PATENTED SEPT. 27, 1904.
W. R. STAPLES.
ADDING MACHINE.
APPLICATION FILED AUG. 8, 1902.
NO MODEL. 9 SHEETS—SHEET 2.

No. 770,875. PATENTED SEPT. 27, 1904.
W. R. STAPLES.
ADDING MACHINE.
APPLICATION FILED AUG. 8, 1902.
NO MODEL. 9 SHEETS—SHEET 5.

No. 770,875. PATENTED SEPT. 27, 1904.
W. R. STAPLES.
ADDING MACHINE.
APPLICATION FILED AUG. 8, 1902.
NO MODEL. 9 SHEETS—SHEET 6.

No. 770,875. PATENTED SEPT. 27, 1904.
W. R. STAPLES.
ADDING MACHINE.
APPLICATION FILED AUG. 8, 1902.
NO MODEL. 9 SHEETS—SHEET 7.

No. 770,875. PATENTED SEPT. 27, 1904.
W. R. STAPLES.
ADDING MACHINE.
APPLICATION FILED AUG. 8, 1902.
NO MODEL. 9 SHEETS—SHEET 8.

Witnesses — Inventor —
Walter R. Staples
Enoch Edmonston Jr. by Geo. S. Hamlin
Atty.

No. 770,875. PATENTED SEPT. 27, 1904.
W. R. STAPLES.
ADDING MACHINE.
APPLICATION FILED AUG. 8, 1902.
NO MODEL. 9 SHEETS—SHEET 9.

Witnesses.

Inventor.
Waller R. Staples
by Geo. N. Hamlin
Atty.

No. 770,875.

Patented September 27, 1904.

UNITED STATES PATENT OFFICE.

WALLER R. STAPLES, OF SISTERSVILLE, WEST VIRGINIA.

ADDING-MACHINE.

SPECIFICATION forming part of Letters Patent No. 770,875, dated September 27, 1904.

Application filed August 8, 1902. Serial No. 118,885. (No model.)

*To all whom it may concern:*

Be it known that I, WALLER R. STAPLES, a citizen of the United States, residing at Sistersville, county of Tyler, and State of West Virginia, have invented certain new and useful Improvements in Adding-Machines, of which the following is a specification.

My invention relates to adding-machines.

The object of the present invention is the provision of a machine of improved and novel construction designed, primarily, for the addition of figures, which may also be used for subtracting, multiplying, or dividing.

The machine is provided with nine digit-keys and a cipher-key and a series of arresters, one in operative conjunction with each of said keys except those representing the figure "9" and the cipher. There is also a series of controllers in number corresponding to the number of columns or decimals in the capacity of the machine, which controllers are of the shape of a segment of a ring and have an oscillating movement through a limited arc concentric with their shape. These controllers are held under spring tension in their normal position, and upon the operation of any key the first controller at the right of the series is released and moves in its circular path until arrested by the arresters aforesaid, the extent of its movement being determined by the value of the key employed, and remains in the position where arrested. Upon the operation of any other key the next controller on the left is released and then arrested, and so on, according to the number of figures in the first row. An axle disposed at right angles to the planes of the motion of the controllers carries the series of register-wheels, which are loosely mounted thereupon concentric to the controllers, said register-wheels normally resting to the left of the series of controllers, so that the first register-wheel on the right is in the plane of the first controller on the left. In this position the group of register-wheels compress a spiral spring around the said axle, which is normally held in compression by a detent-arm. Upon the employment of a hand-operated device the detent-arm recedes from the group of register-wheels and the spiral spring pushes them to the right, so that the first register-wheel on the right moves into the plane of the controller last set and is there arrested by a stop-lever, which was thrown into place upon the release of the controller last set. Hinged to the forward ends of the controllers are fingers, (one for each controller,) which are located between the controllers and the peripheries of the register-wheels. The hand operating device when actuated operates a U-shaped lever, which has its extremities centered on the said axle carrying the register-wheels and which in its rotary motion picks up the fingers above mentioned and causes their rear ends to engage the cogs of the register-wheels, and the lever carrying the controllers back to their normal position carries with each controller its corresponding register-wheel through an arc equal to the movement induced in the controller when it was released and arrested. This sets up the first row of figures on the register-wheels, after which they are returned to their normal lateral position. When the keys have been operated for the second row of figures, the corresponding number of controllers released, moved, and arrested, the manipulation of the hand operating device again permits the group of register-wheels to slide into the plane of the controller and the concentric U-shaped lever again returns the controllers to normal position, thereby imparting an additional movement to each register-wheel, thus adding the last row of figures to the first row set up. If the successive motion of any one wheel is equal to or greater than ten units of arc, a carrying device transfers this movement to the register-wheel of the next higher order, advancing the same one unit of arc.

The details of the invention are fully described hereinafter and the novel features and combinations set forth in the appended claims.

Figure 2:
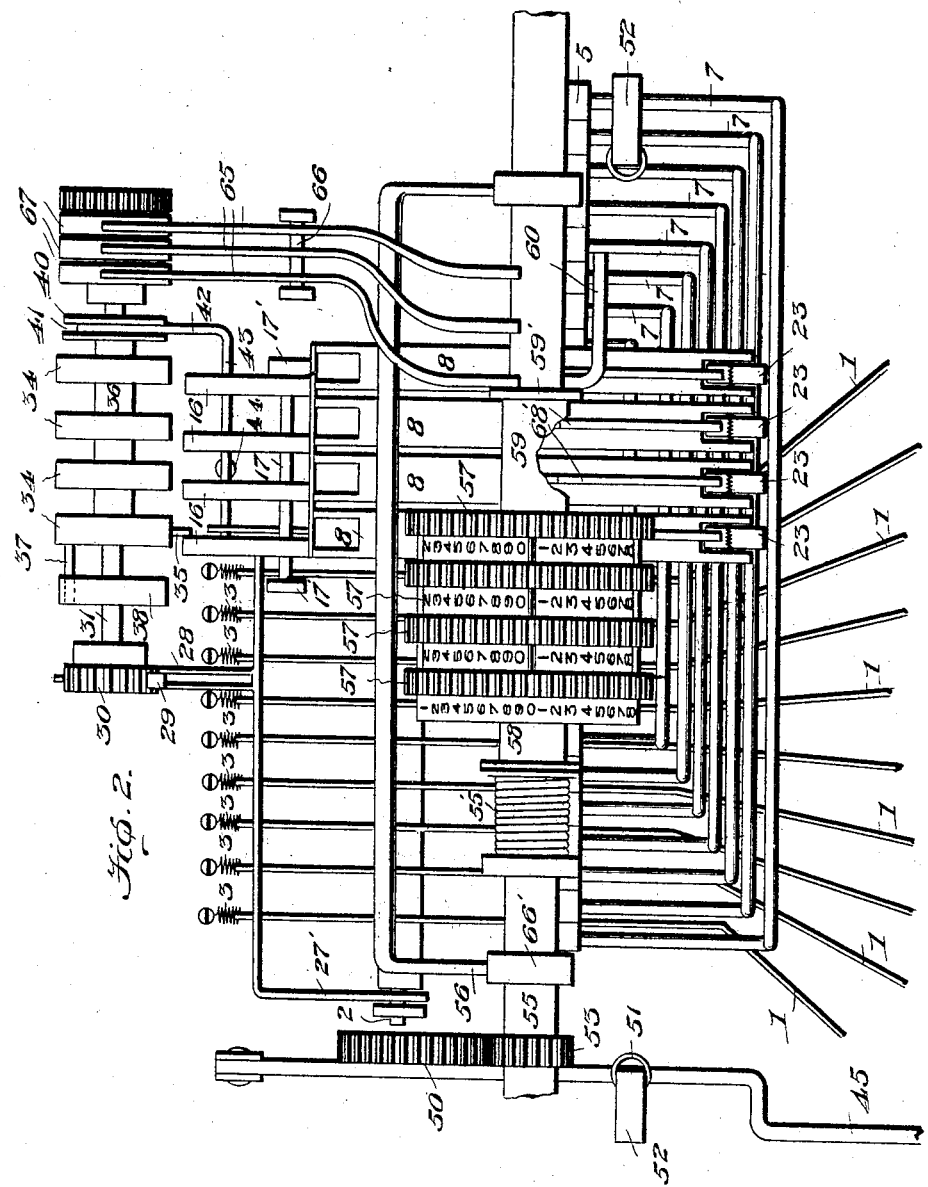
Figure 3:
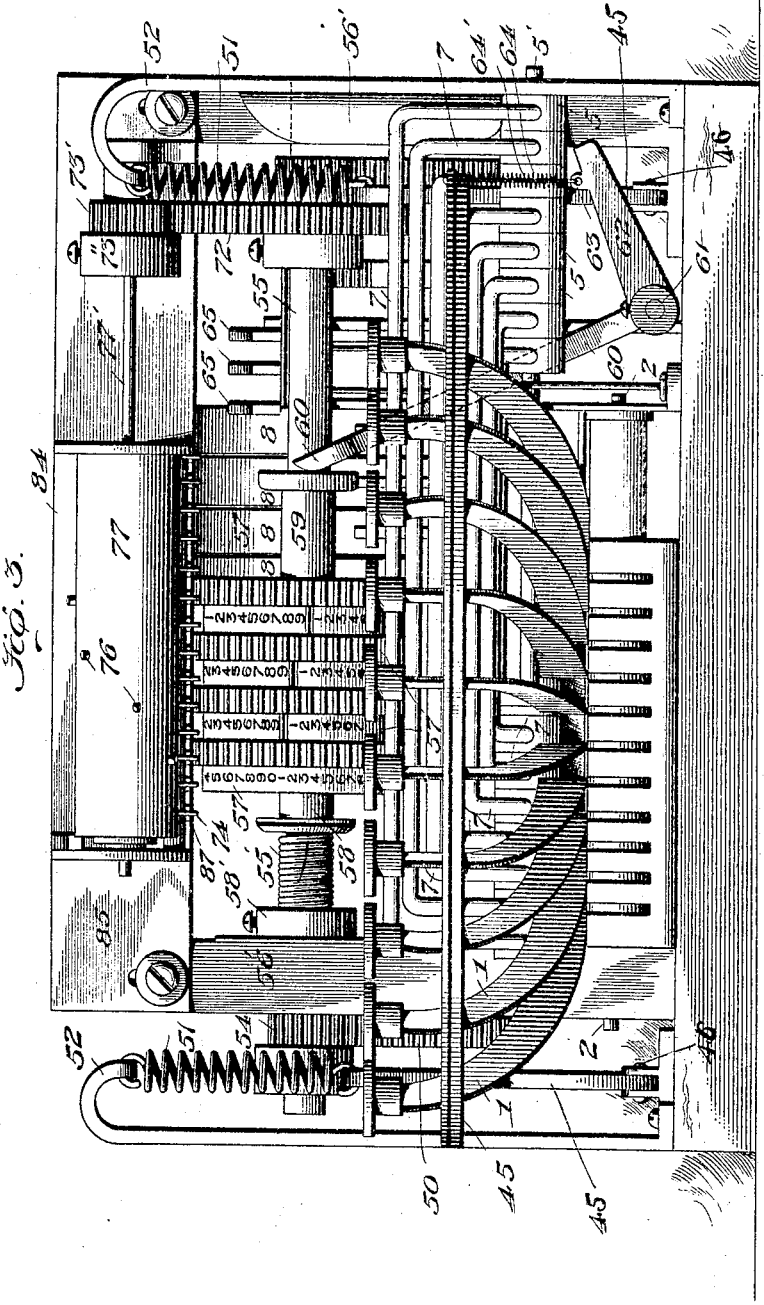
Figure 4:
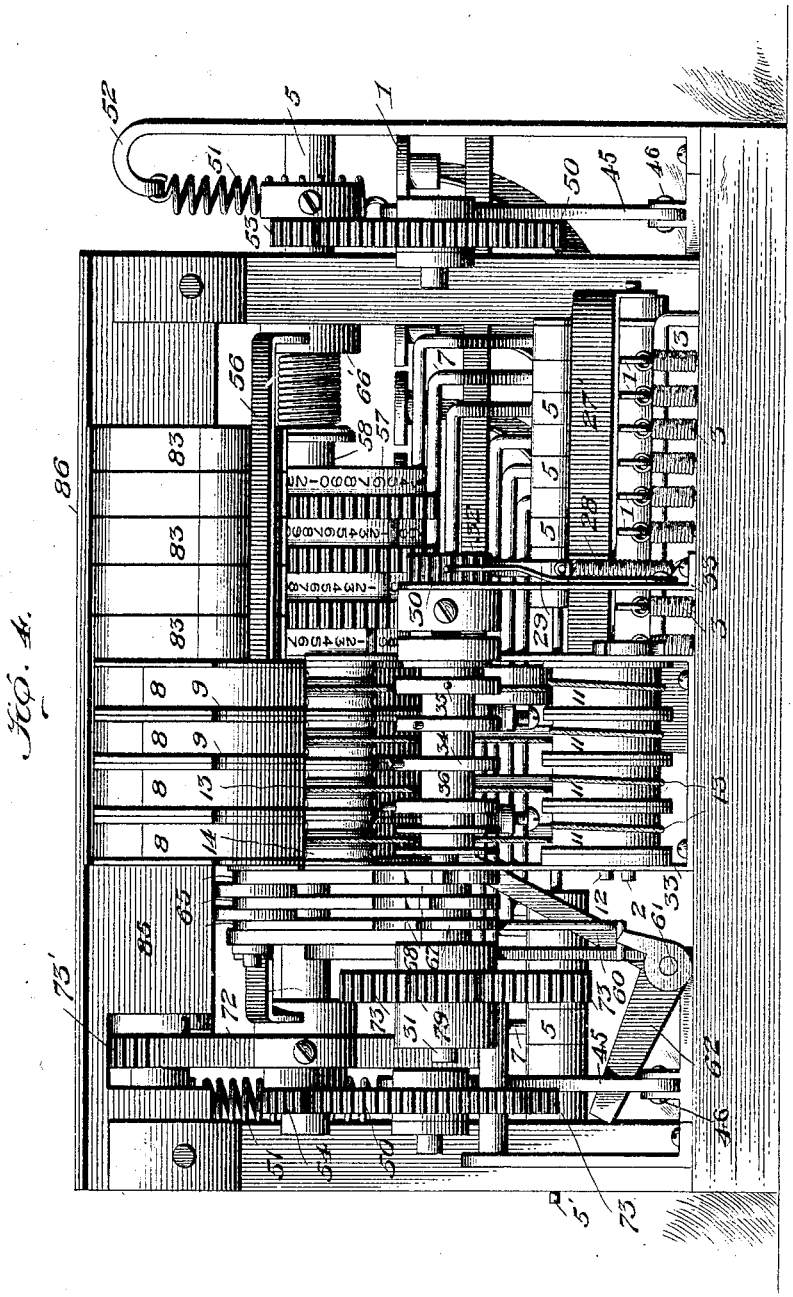
Figure 5:
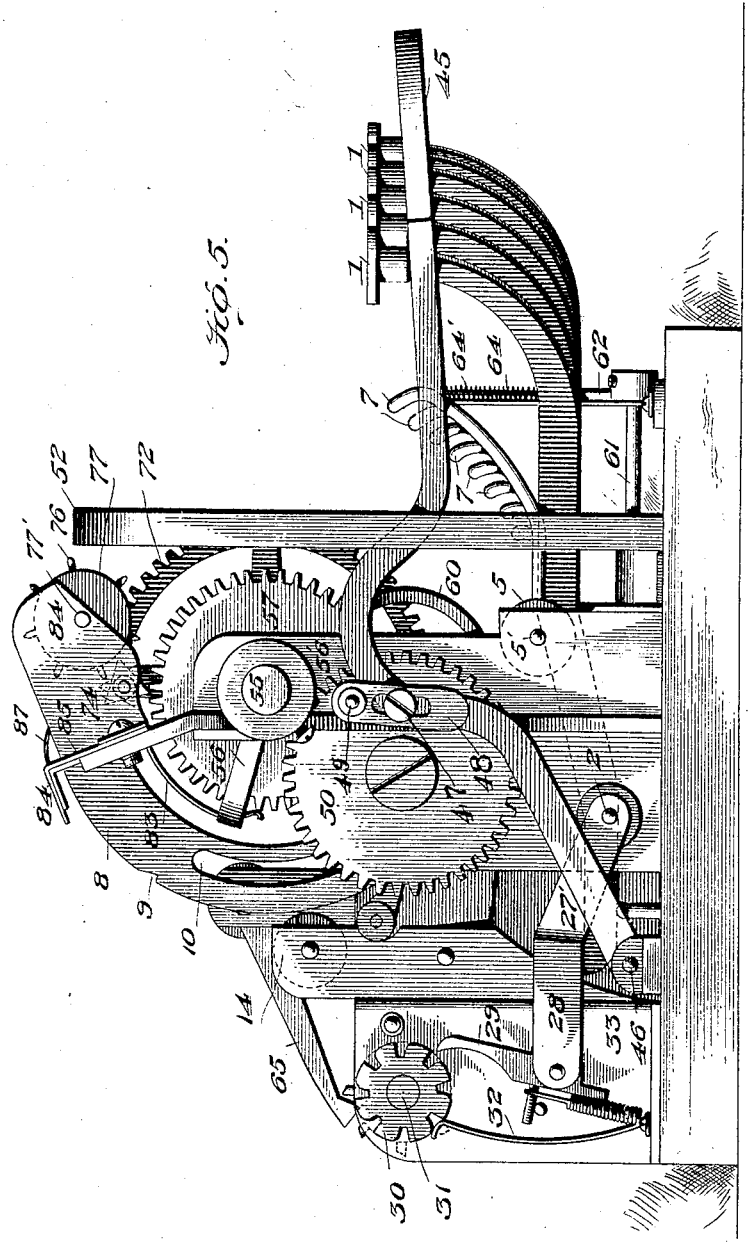
Figure 6:
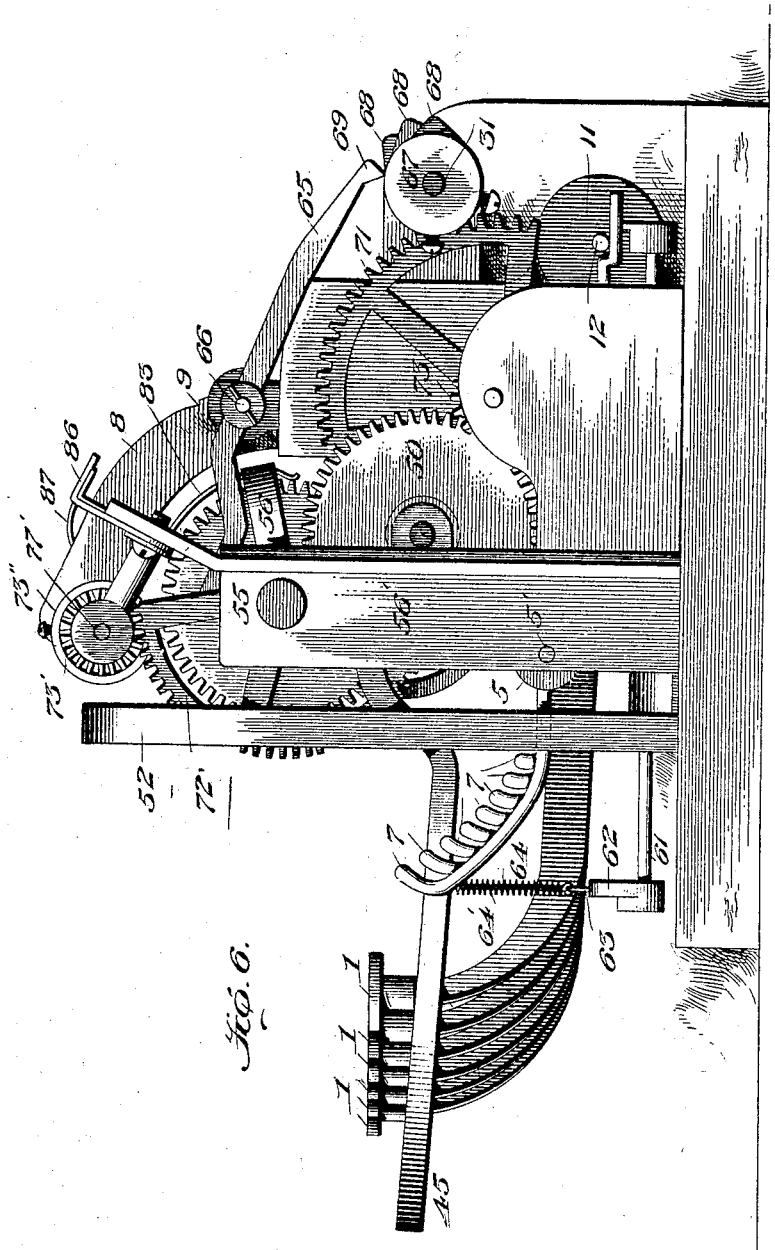
Figure 7:
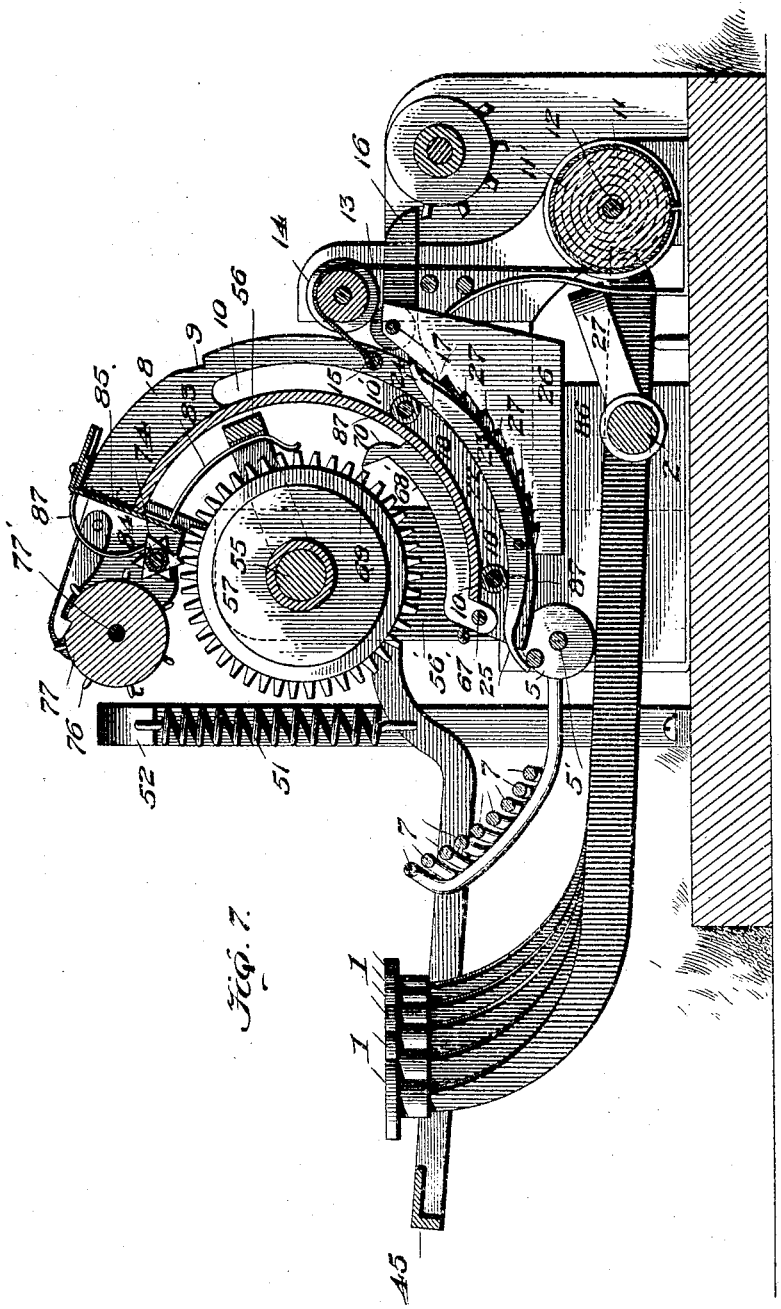
Figure 8:
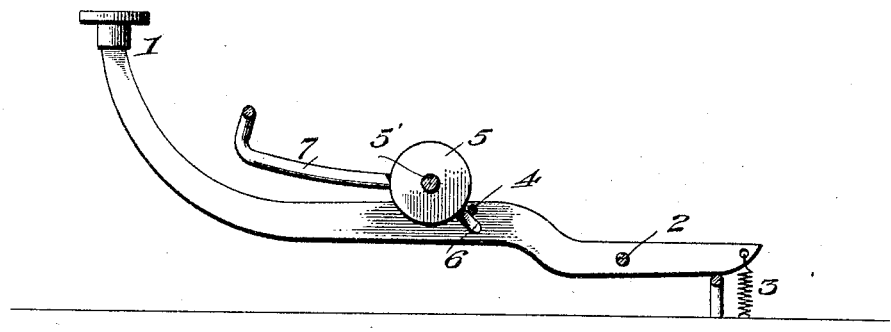
Figure 9:
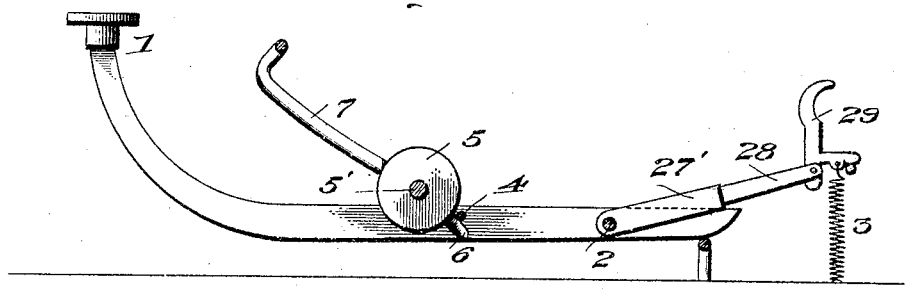
Figure 10:
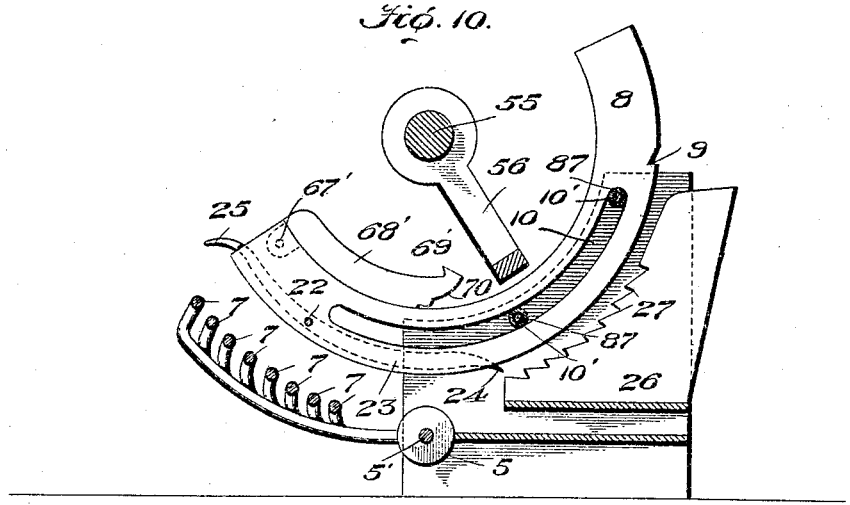
Figure 11:
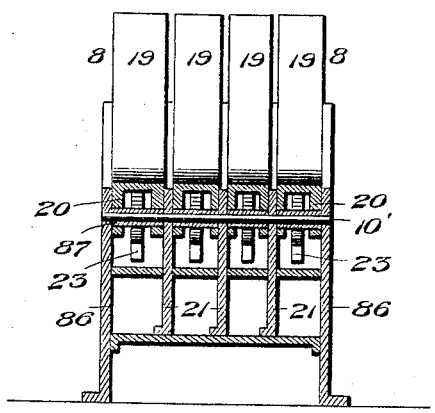
Figure 12:
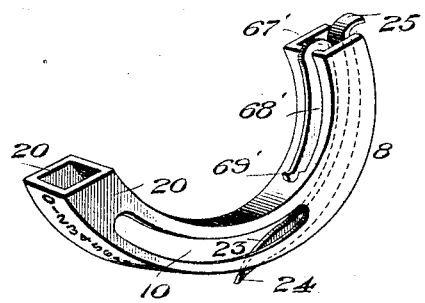
Figure 13:
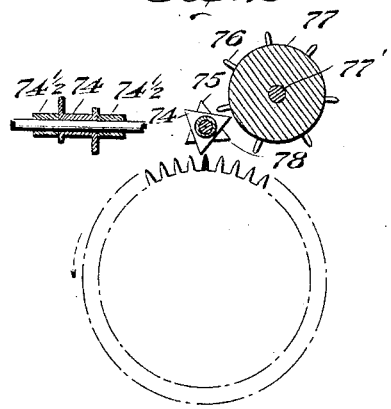
Figure 14:
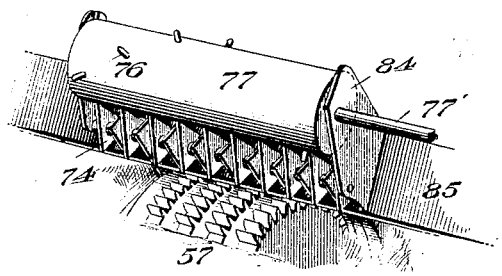
Figure 15:
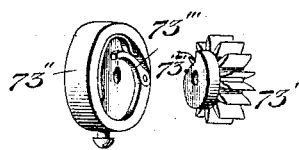
Figure 16:
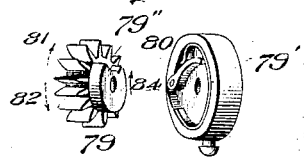

In the accompanying drawings, Figure 1 is a plan view of the machine; Fig. 2, a plan with a portion of the upper part of the machine removed; Fig. 3, a front elevation viewed from the position of the operator; Fig. 4, a rear elevation; Fig. 5, an elevation of the left end of the machine; Fig. 6, an elevation of the right end of the machine; Fig. 7, a section taken on line $x$ $x$ of Fig. 1; Figs. 8 and 9, details of the key action; Fig. 10, a detail side elevation of a controller, the arresters, and other adjacent parts; Fig. 11, a detail sectional elevation of the series of controllers; Fig. 12, a detail perspective of a controller; Figs. 13 and 14, details of the carrying or transferring mechanism; Fig. 15, a detail of the pinion and ratchet-hub for turning the transfer-drum; Fig. 16, a detail of the pinion and ratchet-hub for turning the trip-shaft or axle.

The keys 1 are pivoted on a center 2 and held with their forward ends elevated by independent spiral springs 3, Figs. 1, 2, 4, 8, and 9. On each of the key-levers except those for the key 9 and the cipher-key and forward of the center 2 a convenient distance are pins 4, Figs. 8 and 9, which engage a projection 6 on the disk 5, so that upon the depression of a given key the pin 4 bears upon the projection 6 and causes the corresponding disk 5 to turn around its center. There are sixteen of the disks 5 all centered on rod 5', one for each end of eight arresters 7. There are only eight arresters, for reasons to be hereinafter explained. These arresters are in the shape of a long letter U with the base turned up. Each end of each arrester is rigidly connected with a disk 5, and upon the movement of the disks to which the arrester is connected the arrester rises until it intercepts the circular path of the controllers 8, Figs. 1, 2, 3, 5, 7, 10, 11, and 12. These controllers are of arc shape, being approximately the half of a section of a cylinder having a slotted orifice 10 concentric therewith and extending through from side to side and provided with a notch 9 on their outer perimeter. As many of these controllers are provided as there are columns in the capacity of the machine. For convenience only four are shown in the drawings. Four circular drums 11 at the back of the machine, Figs. 4, 6, and 7, are centered on a fixed axle 12 and actuated by independent spiral springs 11', one end of the spring being attached to the axle and the other end being attached to the drum. Around each of these drums is wound a cord 13, which has one end connected thereto, and these cords pass over independent pulleys 14 and have their other ends attached to the outer surfaces of the respective controllers 8 at the points 15. (See Figs. 1, 4, and 7.) When any controller is in its normal condition, its drum 11 is wound up, the spring 11' being under tension and the cord taut. The controller is then in the "set" position shown in Fig. 10 and the tendency of the controller is to move toward the position shown in Figs. 5 and 7, the total or possible circular movement of the controller being through nine units of arc, each unit of arc representing one-fiftieth of a circle or 7.2 degrees. The controllers are held in normal or set position by independent trip-levers 16, centered on a pin 17, ending in uprights 17', Figs. 2 and 7. The points 18 of the trip-levers fitting in the notches 9 on the controllers hold the controllers in normal position under the tension of the springs and cords.

The series of controllers is shown in detail in vertical section in Fig. 11, their inner or upper curved faces being shown at 19 and their sides at 20, each side 20 having the curved slot 10, and through the slots of all the controllers extend two pins 10', Fig. 10, held in stationary plates 86, Fig. 11. Loose on the pins are sleeves or rollers 87, Figs. 10 and 11, held variously against endwise displacement by the sides 86 and webs 21, which are received in the slots 10 and serve as guides and antifriction-bearings for the controllers. Inside of each controller, pivoted by a pin 22, Figs. 7 and 10, is a lever 23, having a point 24 and a heel 25. In the plane of each controller is a plate 26, Figs. 7 and 10, having eight notches 27, over which the point 24 of the lever 23 travels. Upon the operation of any key the corresponding arrester rises into the circle of the outer edge of the controller. By mechanism hereinafter to be described the trip-lever 16 is thrown and the point 18 moves out of the notch 9, the tension of the spring causes the controller to move in its circular path until the heel 25 of the lever 23 comes in contact with the arrester aforesaid. This causes a slight motion of the lever on its center 22, so that the point 24 of the lever engages in one of the notches 27 of the plate 26, locking the controller at that point. If the key representing the figure "1" is used, the first arrester to the left of the series is operated and arrests the motion of the controller in the first unit of arc, and point 24 engages the lower cog to the left of the plate 26, Fig. 7. If the key representing the figure "8" is used, the arrester to the right of the series is operated and the controller continues unarrested through eight units of arc. If the key representing the figure "9" is depressed, the controller moves through its entire path until arrested by the striking of the lower end of slot 10 against lower roller 87, and the controller will then be in the position shown in Fig. 7. If the key representing the cipher is depressed, the controller is not released.

A U-shaped lever 27', Figs. 1, 2, 5, 7, and 9, is centered on the center 2 and rests on the rear end of all the keys, so that upon the operation of any key said lever is raised. An arm 28, Figs. 2, 5, and 9, is a rigid extension of this lever and carries a pawl 29, which is raised upon the depression of any key. Upon being raised this pawl engages the tooth of the cog-wheel 30, secured rigidly on an axle 31, Figs. 1, 2, and 5, so that upon the operation of any key the pawl 29 is raised and the cog-wheel 30 is advanced the space of one notch. The wheel 30 has as many teeth as there are columns in the capacity of the machine. A spring 32, Fig. 5, holds wheel 30 in any position. The axle 31 is journaled in uprights 33, Fig. 1, attached rigidly to the base of the machine. On the axle and revolving with it are a series of disks 34, Figs. 1 and 2, corresponding in number to the number of cogs in the wheel 30. On each of the disks 34 is a pin 35, Figs. 1 and 2, which are so placed that the pin on the disk to the right, as shown in Figs. 1 and 2, is in advance of the pin on the disk to the left by the same arc that measures the difference between the cogs on the wheel 30. In other words, if the disk were a continuous cylinder the pins would outline the path of a helix. When the machine is set for the beginning of operation, the first pin 35 on the first disk to the left, Figs. 1 and 2, is directly under the first trip-lever 16 to the left. (See Figs. 1 and 2.) Upon the depression of any key the lever 27, Fig. 5, is raised, the pawl 29 is raised, and advances the cog-wheel 30, so that the pin 35 on the first disk to the left, Figs. 1 and 2, throws the trip-lever 16, the point 18 passes out of the notch 9 in the first controller on the left, and the tension on the cord causes the first controller on the left to move until arrested. This brings the pin 35 on the second disk 34 to the right directly under the second trip-lever 16 to the right, and upon the depression of any other key the pawl 29 is raised, the wheel 30 advances, the pin 35 trips the second trip-lever 16 to the right, and the second controller to the right is released and moves until arrested. Said disks 34 are rigidly attached to or formed integral with a hollow axle or sleeve 36, which is slidable on axle 31, and the end disk is provided with a pin 37, received loosely in a hole in a disk 38, which is rigidly secured to axle 31. Provision is thus made for the continued rotation of the disks 34 with axle 31 and cog-wheel 30 and for a sliding movement of the disks 34 and sleeve 36 toward and away from disk 38. The sliding or shifting of the disks is accomplished by the provision of a disk 40, rigid with axle 36 and having a groove 41, which receives a lever 42, Figs. 1 and 2. Upon the depression of the cipher-key the heel 43 of lever 42 is raised, the lever moves on its pivot 44 and carries with it the disks 40 and 34 and axle or sleeve 36 toward the right, and the motion is sufficient to shift the pins 35 sufficiently to pass the trip-levers 16, leaving the controller in its normal position.

A spacing-bar 45 is centered at 46, Figs. 1, 3, 4, and 5, in shoes attached to the base of the machine and has screws or pins 47, which move in open links 48, depending from pins 49 on cog-wheels 50, Fig. 5, this construction being duplicated at the opposite end of the machine. The spacing-bar is normally held in its upright position by two spiral springs 51, suspended from stationary upright hooks 52. Upon the depression of the spacing-bar the cog-wheels 50 have imparted thereto a motion from left to right, as seen in Fig. 5.

Geared to the wheels 50 are pinions 53 and 54, (see Figs. 1 and 2,) which are rigidly attached to an axle 55, Figs. 1, 2, 3, 4, 5, 6, and 7. On this axle are mounted loosely a series of independently-rotatable register-wheels 57, Figs. 2, 3, 4, 5, 7, and 13, each of which is composed of two disks of convenient width or thickness rigidly attached to one another. The disk to the right has fifty cogs, (or any other multiple of ten,) the disk to the left has a smooth surface on which the figures are indicated; but wherever the cipher would come there is a continuation of the cog immediately adjacent on the disk to the right. For convenience there are four of these disks shown in the drawings. They are held close together side by side between sleeves 58 and 59, Figs. 2 and 3, on axle 55. Interposed between sleeve 58 and one of the heads 66' of a U-shaped lever 56 (described later) and surrounding axle 55 is an expansible coil-spring 55', which when the series of register-wheels is to the extreme left, as shown in Figs. 1, 2, and 3, is compressed, (which is the normal position,) this position being caused by the pressure of a lever 60, Figs. 1, 2, and 3, against sleeve 59. The lever 60 is connected to a rod or shaft 61, which rod has also attached to it a second lever 62, thereby forming a bell-joint. In the end of the lever 62 is an eye 63, into which is hooked a rod 64, whose upper end passes through an eye in the spacing-bar 45, and around the rod 64 is a small coil-spring 64'. Upon the depression of the spacing-bar 45 the coil-spring 64' is compressed, causing the lever 62 to move downward and the lever 60 to move to the right, allowing the coil-spring 55' on axle 55 to force the entire set of register-wheels to the right on said axle. The motion of the lever-bar 60 in releasing the register-wheels is through an arc sufficient to allow the first register-wheel on the right to pass through the plane of the first controller on the left and entirely over to the plane of the controller on the right; but the sliding motion of the group of register-wheels is limited to the number of controllers which have been set, so that the first register-wheel on the right stops in the plane of the controller last set. This is accomplished by means of a series of stop-levers 65, Figs. 1, 2, 3, 4, 5, and 6, hinged on an axle 66, Figs. 2 and 6, centered in uprights rigidly attached to the base of the machine.

Rigidly attached to the axle 31, Figs. 1, 2, and 6, is a series of cams 67, Fig. 6, equal in number to the number of stop-levers, which in turn are equal in number to the number of register-wheels less one. Each cam has a heel or projection 68, said projections being in sequence—that is to say, the heel of the first cam on the left, as seen in Fig. 1, is in such position that when the first pin 35 on the disk 34 to the left in Figs. 1 and 2 is directly under the first trip-lever 16 to the left then the heel of the first cam to the left is directly under the heel 69, Fig. 6, of the first stop-lever 65 to the left and has raised the rear end of the said stop-lever, depressing its forward end 65', Fig. 3, so that when the lever 60 moves to the right (on depressing the spacing-bar 45) the forward end of the said first stop-lever 65 to the left will engage the disk end 59' of the sleeve 59, Figs. 2 and 3, and there arrest the sliding motion of the register-wheels, so that the first register-wheel on the right remains in the plane of the first controller on the left. When the pin 35 on the second disk 34 from the left in Figs. 2 and 3 is directly under the second trip-lever 16 from the left, the heel of the second cam from the left raises the rear end of the second lever 65 from the left, permitting the first register-wheel on the right to pass to the plane of the second controller from the left; but the disk end 59' of the sleeve 59, Fig. 3, is stopped by the forward end of the second lever 65 from the left, and so on, according to the number of controllers which have been set. The corresponding lever 65 has its forward end depressed to permit the correct number of register-wheels to pass into the planes of the said controllers, the movement of the sleeve 59 on the axle 55 being limited to stop the first register-wheel on the right in the plane of the controller last set. The operation of turning the axle 31, which raises the rear ends of the levers 65 in succession, also lowers the rear end of the levers 65 previously raised, so that only one is elevated at the time. As described thus far the numbers have been set up on the controllers and the proper number of register-wheels brought into the plane of the controllers so set up.

Rigidly attached to the axle 55 is a U-shaped lever 56. (Shown in Figs. 2, 4, 5, 6, 7, and 10.) At the forward end of each controller and hinged by a pin 67, Figs. 7, 10, and 12, and resting on its inner perimeter is a curved finger 68' with a point 69'. Upon the rotation of the axle 55 by means of the spacing-bar the U-shaped lever 56 travels in a circular path between the outer perimeter of the register-wheels and the inner perimeter of the controllers and strikes against the heel 70 of the finger 68, Figs. 7 and 10, lifting the point 69 into engagement with the cogs on the register-wheel, and as it continues its movement carries so many of the controllers as have been set back to their normal position, carrying with them the corresponding register-wheels, moving the said wheels through the same number of units of arc as the controllers originally moved on being released by the keys, thereby setting up on the register-wheels the first row of figures set up on the controllers. The ends 18 of the trip-levers 16 engage the notches 9 of the controllers 8 as soon as the controllers have been returned to their normal position and retain them ready for successive release by the keys in setting up the second row of figures. This is all accomplished on the downward stroke of the spacing-bar. As the spacing-bar returns it actuates, through the medium of a series of gears 71 72 73, Fig. 6, the two mechanisms which perform the following offices: first, the carrying of the digits from one register-wheel to the other and the return of the axle 31 to such position that the pin 35 on the first disk 34 to the left is again in position to engage the first trip-lever 16 on the left. The carrying device is operated by the gear 72 and the pinion 73' and consists of a series of groups of star-wheels 74, Figs. 5, 7, 13, and 14, each of these groups consisting of two equilateral triangles, one of the said triangles on either end of the short sleeve 74½, Fig. 13, so that one of the triangles being in the plane of the figured portion of one register-wheel the other triangle is in the plane of the cogged portion of the next register to the left. These triangles are so attached to the sleeve that when one point of the triangle to the right is ready to be engaged by the cog where the cipher ought to be on the figured portion of the register-wheel one point of the triangle to the left on the same sleeve is eighty degrees behind it, leaving forty degrees between this and the next point of the first triangle on the sleeve to the left. In Fig. 13 the cog shaded solid is one of the cogs in the place of the cipher on the figured portion of the register-wheel. The cogs unshaded are the cogs of the next register-wheel to the left, so that if the first register-wheel to the right has its cipher to pass the initial point it thereby advances the group of two triangles, so that the point 75, Fig. 13, on the second triangle is brought into the path of one of the pins 76, fastened on the drum 77, Figs. 1, 3, 5, 7, and 13, and hence when the drum 77, which is rigidly attached to shaft 77', on which is the gear 73', is rotated the aforesaid pin 76 will engage the point 75 of the triangle to the left on said group and move it through eighty degrees of arc, causing the point 78 on the same triangle to engage the cog on the register-wheel on the left of the register-wheel before mentioned and move it through one unit of arc. The pins 76 are placed in spiral position around the drum 77, and there is a group of the star-wheels for every possible position of the register-wheels in their motion from left to right—that is to say, if there are four register-wheels, as shown, there are seven groups of star-wheels, and when the gear 73' is rotated as the spacing-bar returns to its normal position the first pin 76 on the right will engage the first group of triangles on the right if they have been set, the next pin on the left will engage the next group, and so on, picking up successively all the triangles as they are set. If this operation of carrying advances a register-wheel, so that the cipher passes the initial point, that operation thereby sets the next group of triangles on the left, which are immediately advanced by the next pin on the left, and the carrying process is carried on across the entire group of register-wheels whatever lateral position they may occupy. As shown in Fig. 15, the pinion 73′ is loose on shaft 77′, and 73″ is a hub secured to said shaft and having a spring-pressed ratchet 73‴, adapted to engage a notch 73⁗ in the hub of the pinion 73′ on the return of the spacing-bar 45 to normal position. The return of the spacing-bar to normal position makes a complete rotation of the drum 77, so that the first pin on the right stops in the position from which it started. At the same time that the spacing-bar is returned to its normal position the wheel 73 returns the trip mechanism to its normal position by turning the gear 79, Figs. 1, 2, and 16, loosely mounted on the axle 31. Rigidly attached to the said axle, as shown in Fig. 16, is a hub 79′, having a spring-pressed ratchet 80, adapted to engage a notch 79″ in the gear 79 on the return of the spacing-bar. As the process of releasing the controllers proceeds this axle 31 moves in the direction of the inner arrow 81, Fig. 16. When the spacing-bar is depressed, the cog-wheel 79 moves in the direction of the arrow 82, making a complete revolution, so that the ratchet 80 will pass over the notch 79″. As the spacing-bar returns to normal position the cog-wheel 79 moves in the direction of the arrow 84, making a complete revolution, so that the ratchet 80 will engage notch 79″ and carry the axle 31 back.

When the process of carrying the digits has been completed, the continuing return of the spacing-bar presses the lever 60 against the end 59′ of the sleeve 59 and throws the entire group of register-wheels to their extreme position on the left. A series of elbow-springs 83, Figs. 4, 5, and 7, across the whole range of sliding movement of the register-wheels confines them where set, prevents accidental turning, and permits the sliding motion. The axle of the drum 77 is centered in a plate 84 at each end, and this plate is fastened to a cross-bar 85, rigidly attached to the uprights 56′, and has a cap-bar 86 attached to it, which holds a series of springs 87, Figs. 1, 5, and 7, which prevent the star-wheels from turning.

On the outer perimeter of the controllers are raised numerals "0," "1," "2," "3," "4," "5," "6," "7," "8," and "9," Fig. 12. When the controllers are in normal position, there appears a line of ciphers. Upon their advancement by the operation on one digit-key that numeral appears which measures the unit of arc through which they have been advanced and there is thus presented a line of figures representing that which has been registered by the operation of the keys. A suitable printing mechanism will be attached to the machine for the purpose of recording the line of figures so appearing.

Having thus described my invention, what I claim as new, and desire to secure by Letters Patent, is—

1. In a machine of the class described, the combination with a plurality of shiftable register devices, of a plurality of controllers, keys for advancing the controllers successively, means for shifting the register devices into position for coöperation with the controllers so advanced, means for returning the controllers to normal position and thereby advancing the register devices, and means for reshifting the register devices to their normal position.

2. In a machine of the class described, the combination with a plurality of register devices shiftable as an entirety, of a plurality of controllers, keys for advancing the controllers successively, means for shifting the register devices into position for coöperation with the controllers so advanced, means for returning the controllers to normal position and thereby advancing the register devices, and means for reshifting the register devices to their normal position.

3. In a machine of the class described, the combination with a plurality of shiftable register devices, of a plurality of controllers, key connections thereto, successively operating for advancing such controllers as it is desired to advance, and for passing without advancement such controllers as are not desired to be advanced, according to the key employed, means for shifting the register devices into position for coöperation with the controllers so advanced, means for returning the advanced controllers to normal position and thereby advancing the register devices, and means for reshifting the register devices to their normal position.

4. In a machine of the class described, the combination with a plurality of shiftable register devices, of transfer mechanism adapted to be set by said devices, a plurality of controllers, keys for advancing the controllers successively, means for shifting the register devices into position for coöperation with the controllers so advanced, means for returning the controllers to normal position and thereby advancing the register devices, means for operating the transfer mechanism, and means for reshifting the register devices to their normal position.

5. In a machine of the class described, the combination with a plurality of register devices movable transversely, of transfer mechanism interposed between said devices and settable thereby, a plurality of controllers with indicia thereon, key connections thereto for advancing the controllers successively, means for shifting the register devices into position opposite the controllers so advanced, means for returning the controllers to normal position thereby advancing the register devices opposite thereto, means for operating the transfer mechanism, and means for reshifting the register devices to their normal position.

6. In a machine of the class described, the combination with a plurality of register devices movable transversely, of transfer mechanism interposed between said devices and settable thereby, a plurality of controllers with indicia thereon, key connections thereto, successively operating, for advancing such controllers as it is desired to advance, and for passing without advancement such controllers as are not desired to be advanced, according to the key employed, means for shifting the register devices into position opposite the controllers so advanced or passed, means for returning the advanced controllers to normal position thereby advancing the register devices opposite thereto, means for operating the transfer mechanism, and means for reshifting the register devices to their normal position.

7. In a machine of the class described, the combination with a plurality of register devices movable transversely, of transfer mechanism transversely immovable whereby a given movement in any one of the register devices advances the register device of the next higher order, a plurality of controllers, key connections thereto for advancing the controllers successively, means for shifting the register devices into position opposite the controllers so advanced, means for returning the controllers to normal position thereby advancing the register devices opposite thereto, means for operating the transfer mechanism, and means for reshifting the register devices to their normal position.

8. In a machine of the class described, the combination with a plurality of register devices adapted for shifting as an entirety, of transfer mechanism interposed between said devices and settable thereby, a plurality of controllers with indicia thereon, key connections thereto for advancing the controllers successively, means for shifting the register devices simultaneously into position opposite the controllers so advanced, means for returning the controllers to normal position thereby advancing the register devices opposite thereto, means for operating the transfer mechanism and means for reshifting the register devices to their normal position, said shifting, reshifting and transfer-mechanism-operating means including a hand-operating device.

9. In a machine of the class described, the combination with a plurality of register devices movable transversely, of a spring-actuated mechanism for moving said devices transversely, key-actuated devices for arresting transverse movement of said devices at predetermined points, and a hand-operated device for releasing the said devices from their normal position permitting them to move transversely until arrested by one of the said arresting devices.

10. In a machine of the class described, the combination with a plurality of register devices movable transversely, of a spring-actuated mechanism for moving said devices transversely, key-actuated means for arresting the transverse movement of the devices at points determined by the number of keys which have been operated, and a hand-operated device for releasing the said devices from their normal position and permitting them to move transversely until arrested by one of the said arresting means.

11. In a machine of the class described, the combination with a plurality of keys, of registering devices operated thereby which are shiftable as an entirety, that is, all together, means for shifting said registering devices, a cylinder advanced through a predetermined arc upon the operation of any one of said keys, and a plurality of stop devices operated successively upon advancement of the said cylinder and adapted to determine the point to which the registering devices can be shifted.

12. In a machine of the class described, the combination with a plurality of keys, of registering devices operated thereby which are shiftable as an entirety, that is, all together, means for shifting said registering devices, a cylinder advanced through a predetermined arc upon the operation of any one of said keys, a plurality of stop devices operated successively upon the advancement of the said cylinder and adapted to determine the point to which the registering devices can be shifted, and means for bringing the cylinder to its initial position.

13. In a machine of the class described, the combination with a plurality of settable controllers adapted to move in the arc of a circle but otherwise immovable, of keys, and operative connections normally conditioned for coöperation with the keys and controllers adapted to induce circular movement in the controllers successively to set said controllers.

14. In a machine of the class described, the combination with a plurality of controllers adapted to move in the arc of a circle only and adapted for independent action without effect on each other, of keys and coöperating means adapted for automatically inducing circular movement in the controllers successively in their order in proportion to the numerical value of the key employed.

15. In a machine of the class described, the combination with nine digit-keys and a cipher-key, of a cylinder advanced through a predetermined arc upon the operation of any one of said keys, means for shifting the cylinder upon the operation of the cipher-key before the said cylinder is advanced by the operation of the said cipher-key, means for reshifting the cylinder upon the release of the cipher-key, projections upon the surface of said cylinder, which together define a helix, and registering devices with which said projections coact.

16. In a machine of the class described, the combination with nine digit-keys and a cipher-key, of a cylinder advanced through a predetermined arc upon the operation of any one of said keys, means for shifting the cylinder upon the operation of the cipher-key before the said cylinder is advanced by the operation of the said cipher-key, means for reshifting the cylinder upon the release of the cipher-key, projections upon the surface of the said cylinder, which together define a helix, trip-levers tripped successively by the said projections upon the operation of the digit-keys but passed without tripping upon the operation of the cipher-key, registering devices with which said trip-levers coact, and means for bringing the cylinder to its initial position.

17. In a machine of the class described, the combination with a plurality of independent controllers each movable in the arc of a circle without effect on any other controller, of spring actuating means adapted for advancing the controllers in their circular arc, means for holding the controllers to prevent their advancement and key-operated means for releasing said holding means of the respective controllers successively.

18. In a machine of the class described, the combination with a plurality of circularly-movable controllers, of key connections thereto for advancing the controllers successively, and pivoted key-operated arresters for arresting the advancement of the controllers at predetermined points.

19. In a machine of the class described, the combination with a plurality of spring-actuated circularly-movable controllers, of means securing the controllers under tension, key connections to the controllers for advancing them successively, and pivoted key-operated arresters for arresting the advancement of the controllers at predetermined points.

20. In a machine of the class described, the combination with a movable controller, of key connections thereto for advancing the controller, actuatable stop devices on the controller for arresting its movement, key-operated arresters for setting said actuatable stop devices, and an abutment with which the actuatable stop devices are adapted to engage at different points determined by the coöperation of said stop devices and arresters.

21. In a machine of the class described, the combination with a movable controller, of key connections thereto for advancing the controller, a pivoted lever carried by the controller, key-operated arresters adapted to engage and throw the lever aforesaid, and a series of abutments with which the lever is made to engage by the coöperation of a given arrester with said lever.

22. In a machine of the class described, the combination with a spring-actuated controller and means for holding it normally under tension, of key connections thereto for releasing the controller, a pivoted lever carried by the controller, a series of abutments with which said lever is adapted to engage, and key-operated arresters adapted to engage the lever and cause its engagement with any of the series of abutments.

23. In a machine of the class described, the combination with nine digit-keys and a cipher-key, of a cylinder advanced through a predetermined arc upon the operation of any one of said keys, registering devices with which said cylinder is normally adapted to coact, means operated by the cipher-key for shifting the cylinder before advancement by the said cipher-key, means for reshifting the cylinder upon the release of the cipher-key, and means for bringing the cylinder to its initial position.

24. In a machine of the class described, the combination with a plurality of register-wheels representing units, tens, hundreds, thousands, &c., which are adapted for shifting as an entirety, that is, in a gang all together, in the direction of their axis of individual rotation, of extraneous or independent transfer mechanism coacting therewith and whereby when the register-wheels are in any position in relation to said extraneous transfer mechanism upon the advancement of any one of said register-wheels through a given arc the register-wheel of the next higher denomination will be advanced.

25. In a machine of the class described, the combination with a plurality of register devices, having a normal position of rest, and key-operated means for arresting the shifting of the devices at predetermined points, of means for shifting said devices from their normal position of rest directly to any of the predetermined points aforesaid.

26. In a machine of the class described, the combination with a plurality of key-operated controllers advanced in proportion to the numerical value of the key employed, of a plurality of register devices, means for shifting said wheels directly and continuously until arrested to bring them into coöperative conjunction with the controllers, and key-operated means for arresting said register devices, in position for coaction with such controllers as have been set.

27. In a machine of the class described, the combination with a plurality of register-wheels and a spring for shifting said wheels, of a hand-operated device adapted for releasing said wheels, and key-operated devices independent of the hand-operated device for arresting the shifting of the wheels at predetermined points.

28. In a machine of the class described, the combination with a plurality of register-wheels, of a positively-actuated device for shifting them transversely directly and continuously until arrested, means for holding said wheels in their transverse normal position against the operation of said shifting device, means for releasing said register-wheels to permit their direct transverse movement, and key-operated means for arresting their transverse movement at points determined by the number of keys theretofore operated.

29. In a machine of the class described, the combination with a plurality of register-wheels adapted for shifting, of a plurality of transfer devices in number one less than double the number of register-wheels, so arranged that in any position to which the register-wheels may be shifted, the advancement of one register-wheel through a predetermined arc will set the adjacent transfer device, and means for operating successively such transfer devices as have been so set to thereby advance the register-wheel of the next highest order.

30. In a machine of the class described, the combination with a plurality of register-wheels adapted for shifting, of a plurality of transfer devices so arranged that in any position to which the register-wheels may be shifted, each register-wheel is in engagement with one of the transfer devices and upon the advancement of any register-wheel through a predetermined arc the adjacent transfer device is then set, and means for operating the transfer devices successively so that any transfer device that is set will be operated and thereby advance the register-wheel of the next highest order from that which set the transfer device.

31. In a machine of the class described, the combination with a plurality of controllers fixed against transverse movement and movable in the arc of a circle, and having indicia thereon, of a plurality of register-wheels moving transversely on an axis concentric with the movement of the controllers, positively-actuating devices for advancing the controllers, means for retaining the controllers against advancement, positively-actuating means for shifting the register-wheels, means for retaining the register-wheels in their normal lateral position, key-operated means for releasing the controllers successively or for passing one or more of them without release, key-operated means for arresting the advancement of the controllers at points determined by the keys operated, means for retaining the controllers where arrested, stops for arresting the transverse movement of the register-wheels, key connections for operating the stops successively, means for releasing the register-wheels thereby permitting their transverse movement until interfered with by the stops aforesaid, means for returning the controllers to their normal position thereby advancing the register-wheels, means for recording the indicia upon the controllers which upon their advancement appear in a given line, means for transferring a given movement in one register-wheel to the register-wheel of the next highest order, means for reshifting the register-wheels to their normal position and means for returning the controller-releasing mechanism to its normal position, the means for releasing the register-wheels, for returning the controllers to their normal position, for operating the transfer mechanism, for returning the register-wheels to their normal position and for recording the indicia on the controllers including a hand-operated device.

32. In a machine of the class described, the combination with a plurality of register-wheels adapted for shifting, of a plurality of keys, a cylinder advanced through a predetermined arc upon the operation of any key, stop-levers for arresting the transverse movement of the register-wheels, successively thrown into position as the cylinder advances and upon the throwing of any stop-lever the stop-lever thrown immediately theretofore being returned to its normal position and means for returning the last stop-lever thrown to its normal position and for returning the stop-lever-throwing device to its normal position.

33. In a machine of the class described, the combination with a plurality of register devices each of which is shiftable, of transfer devices fixed in relation to the said movement of the register devices and adapted to be set thereby, and means for successively operating the said transfer devices.

34. In a machine of the class described, the combination with a plurality of register devices each of which is shiftable, of transfer devices fixed in relation to the said movement of the register devices and aggregating in number one less than double the number of register devices and adapted to be set by the said register devices, and means for successively operating the transfer devices after setting thereof.

35. In a machine of the class described, the combination with a plurality of register devices, of a plurality of key-operated controllers governing the advancement of the register devices, and means for shifting the register devices so that there will be one register device in position for coaction with each controller which has been operated.

36. In a machine of the class described, the combination with a plurality of register devices, of a plurality of key-operated controllers governing the advancement of the register devices, and means for simultaneously shifting the register devices so that there will be one register device in position for coaction with each controller which has been operated.

37. In a machine of the class described, the combination with a plurality of movable controllers settable to different positions, of pawls carried by said controllers, a plurality of register-wheels, key-operated means for setting the controllers, and means for moving the controllers and causing the pawls to engage the register-wheels to thereby induce in said wheels a movement corresponding to that of the controllers.

38. In a machine of the class described, the combination with a plurality of movable controllers, of pawls carried by said controllers, a plurality of register-wheels, and means for engaging the pawls and causing them to engage the register-wheels and thereby simultaneously move the controllers and register-wheels correspondingly.

39. In a machine of the class described, the combination with a plurality of movable arc-shaped controllers having pawls, of a plurality of register-wheels, and a bar adapted to play between the controllers and the wheels and to simultaneously engage the pawls and throw them into engagement with the wheels and thereby turn the controllers and wheels simultaneously and correspondingly.

In testimony whereof I hereunto affix my signature in presence of two witnesses.

WALLER R. STAPLES.

Witnesses:
A. B. EVANS,
K. C. MOORE.